July 7, 1964

C. F. LAAGER 3,139,756

CARTRIDGE OPERATED DEVICE TESTER

Filed June 13, 1961

4 Sheets-Sheet 1

INVENTOR.
CRESTON F. LAAGER

BY
S. J. Rotondi, A. J. Dupont & S. Puhoff

ATTORNEYS

July 7, 1964

C. F. LAAGER 3,139,756

CARTRIDGE OPERATED DEVICE TESTER

Filed June 13, 1961

4 Sheets-Sheet 2

INVENTOR.
CRESTON F. LAAGER

BY S. J. Rotondi,
a. J. Dupont & S. Dubroff

ATTORNEYS.

July 7, 1964     C. F. LAAGER     3,139,756
CARTRIDGE OPERATED DEVICE TESTER
Filed June 13, 1961     4 Sheets-Sheet 3

INVENTOR.
CRESTON F. LAAGER
ATTORNEYS

July 7, 1964  C. F. LAAGER  3,139,756
CARTRIDGE OPERATED DEVICE TESTER

Filed June 13, 1961  4 Sheets-Sheet 4

INVENTOR.
CRESTON F. LAAGER
BY S. J. Rotondi,
A. J. Dupont & S. Dubroff
ATTORNEYS

United States Patent Office 3,139,756
Patented July 7, 1964

3,139,756
CARTRIDGE OPERATED DEVICE TESTER
Creston F. Laager, Beverly, N.J., assignor to the United States of America as represented by the Secretary of the Army
Filed June 13, 1961, Ser. No. 116,894
6 Claims. (Cl. 73—432)
(Granted under Title 35, U.S. Code (1952), sec. 266)

The invention described herein may be manufactured and used by or for the Government for governmental purposes without the payment to me of any royalty thereon.

This invention relates to the testing of cartridge actuated devices. Its purpose is to provide an improved test mechanism which may be operated to simulate the conditions under which the tested device is to be operated.

Cartridge actuated devices are commonly used to operate catapults, canopy removers, and other mechanical devices comprising the personnel escape systems from disabled jet aircraft. This invention is specifically designed to production test canopy removers under exactly the same conditions of load components, direction of thrust and reaction and ballistic integrity as would occur during an emergency jettisoning of a pilot and seat from a real jet airplane. The test apparatus does obtain, electronically, curves upon film that provide information for data reduction and comparative curves.

The procurement specifications contain certain performance standards and safety requirements which are determinable by the ballistic functioning of the canopy removers in the subject test apparatus. As hereinafter explained, the device of the present invention (1) subjects the tested device mounted as in an airplane, to a load equivalent to that moved by the device in actual use, (2) provides the thrust, in foot pounds plotted against time throughout the power stroke, (3) makes available a record useful in the determination of the rate of change of velocity, and (4) other data required by the performance specifications.

The invention will be better understood from the following description when considered in connection with the accompanying drawing and its scope is indicated by the appended claims.

Figure 1:
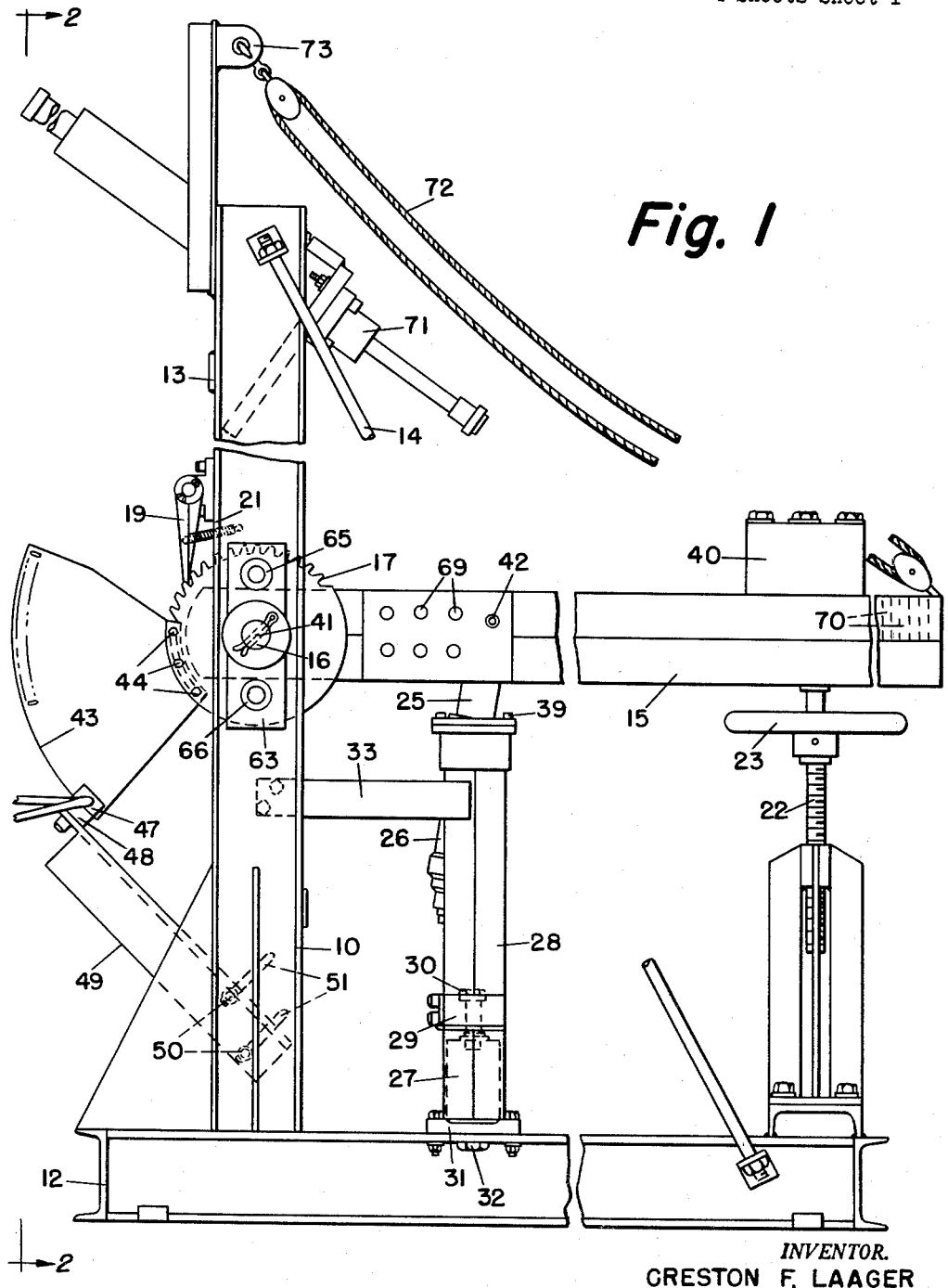
Figure 7:
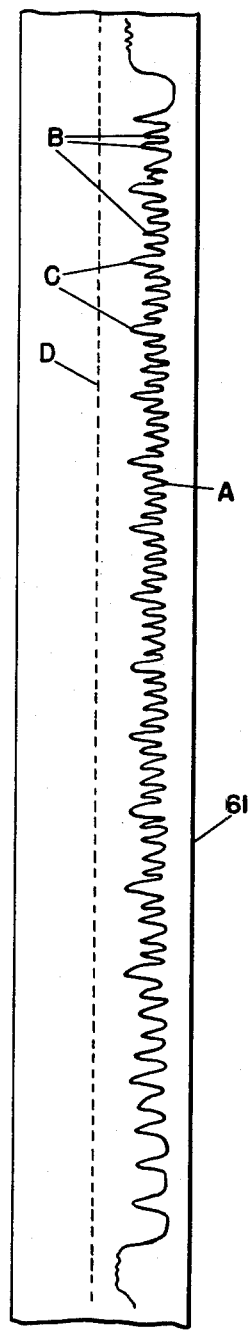

Referring to the drawings:
FIG. 1 is a side view of the test mechanism with a canopy remover fixed in a position to be tested,
FIG. 2 shows the test mechanism as viewed along the line 2—2 of FIG. 1,
FIG. 3 pertains to a bearing through which the force developed by the remover is applied to a load cell,
FIG. 4 illustrates the arrangement and connections of the recording elements of the mechanism,
FIG. 5 outlines the details of a signal plate which functions in connection with the recording elements,
FIG. 6 indicates the physical relation of the signal plate to a light source and photo cell, and
FIG. 7 shows a record of a test made by the mechanism.

Figure 2:
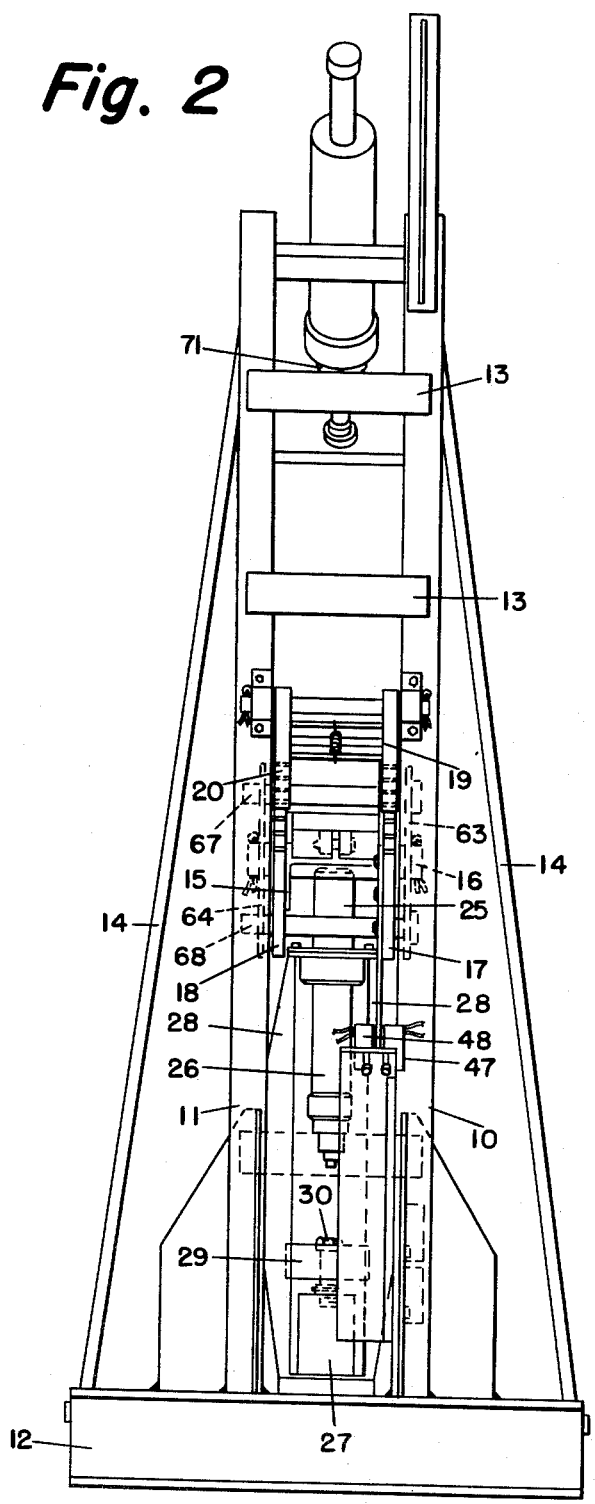

The test mechanism of FIGS. 1 and 2 includes two vertical channel frame members or uprights 10 and 11 which are fixed to a base 12. These uprights are maintained in spaced relationship by cross bars 13 and have their tops attached to the base 12 by rods 14. A thrust testing arm in the form of an I beam 15 is pivoted on a shaft 16 extending between the uprights 10 and 11. Concentric with the shaft 16 and fixed to the arm 15 are a pair of ratchet wheels 17 and 18 arranged to cooperate with pawls 19 and 20, these pawls being each biased to engage its cooperating ratchet wheel by a spring 21.

At its free end, the arm 15 rests on a support 22 which is adjustable in height by rotation of a handwheel 23.

A canopy remover or thruster 25–26 is shown in a position to be tested. This remover includes a piston or plunger part 25, which is normally attached to and moves with the canopy, and a part 26 which is fixed with respect to the aircraft. For test purposes, the part 25 is attached to the arm 15 and part 26 is attached to a load cell 27 through (1) an adapter 28, (2) a plate 29, and (3) a load cell bolt 30. With this arrangement, the part 26 of the remover rests upon the adapter 28 and the adapter 28 rests upon the load cell 27 and is maintained in alinement therewith by guide bars 33 which are supported by the uprights 10 and 11.

The load cell 27 may be of the type illustrated and described on page 7 of a "Bulletin 4300" issued by the Baldwin-Lima-Hamilton Corporation of Waltham 54, Massachusetts, and entitled "Load, Torque, and Fluid Pressure Measurement and Control with SR–4 Devices and Equipment." This load cell functions to provide a voltage which is proportional to the thrust of the canopy remover 25–26. As hereinafter explained, this voltage may be applied to one channel of a three-channel oscilloscope to produce a trace which is photographed on a motion picture film.

Figure 3:
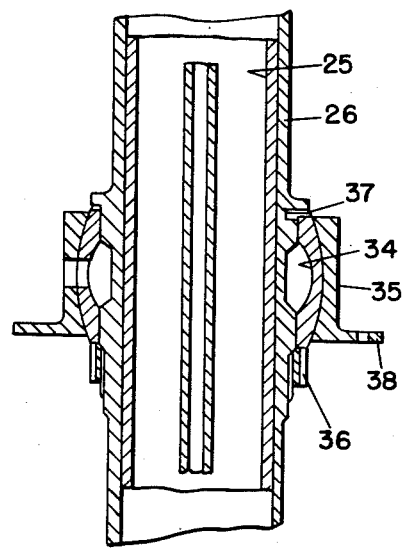
Figure 4:
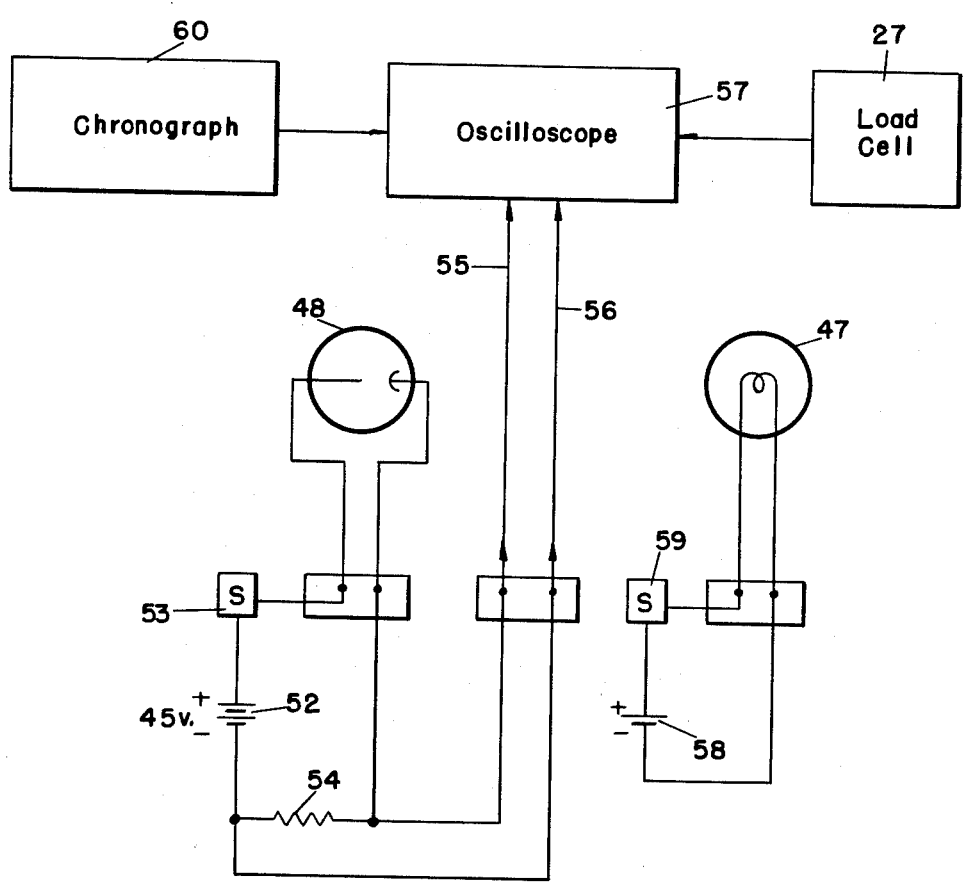

As indicated by FIG. 3, the canopy remover 25–26 is of a type wherein the part 26 is normally fixed to the aircraft through a swivel or ball type bearing consisting of a globular member 34 and a cooperating member 35. The globular member 34 is fixed to the canopy remover member 26 by a retaining ring 36 and index pins 37. The member 35 receives the globular member 34 and has a flange 38 which is normally bolted to the aircraft. For testing purposes, the flange 38 is fixed to the top of the adapter 28 by screws 39.

In testing the canopy remover 25–26, it is essential that the resistance of the arm 15 to the thrust of the remover correspond exactly to the resistance exerted by the canopy during the normal operation of the remover. The factors involved in the accomplishment of this result are (1) the mass moved by the tested remover and (2) the spacing between rotational axis 41 of the arm 15 and the point 42 on the arm at which the thrust of the tested canopy remover is applied. Stated more specifically, the distance between points 41 and 42 is made equal to the spacing between the rotational axis of the canopy and the point on the canopy at which its opening thrust is applied, and there is bolted to the arm 15 a weight 40 of a size to impart to the arm a weight and gravitational center similar to the weight and gravitational center of the canopy.

For measuring the velocity which the arm 15 moves in response to the firing of the remover 25–26, a signal plate 43 is mounted on the ratchet wheel 17. This is accomplished by bolts 44 which extend through a slot in the plate so that it may be adjusted circumferentially of the ratchet wheel. The plate is made individually for each type of remover. The slots are laid out from actual calibration of the specified movement of the remover piston, which is then carefully divided into equal parts.

Figure 5:
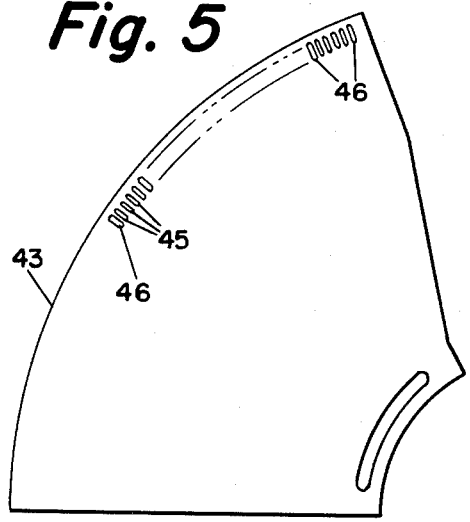
Figure 6:
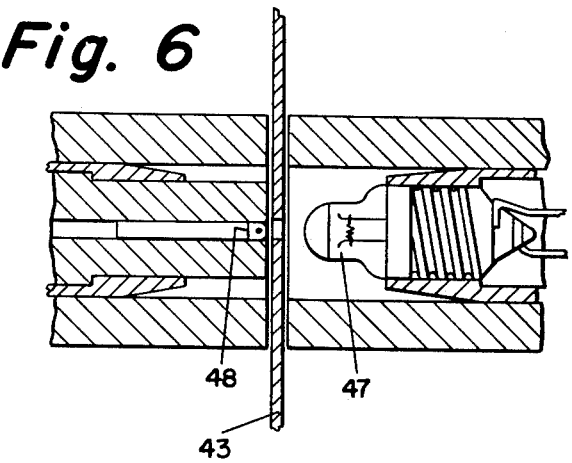

As shown more clearly in FIG. 5, the signal plate 43 has near its outer periphery a series of equally spaced slots, every fifth of these slots being somewhat wider than the other four as an aid in interpretation. Since the wider slot permits more light energy to strike the photocell a higher peak on the oscilliscope results. All the slots may have a length of ½ inch, the narrower slots 45 may have a width of 1/16 inch and the wider slots 46 may have a width of ⅛ inch. Upon rotation of the signal plate 43, the slots 45 and 46 move between a light source 47 and a photocell 48 as indicated by FIGS. 1 and 6. The photocell and light source are mounted on a support 49 by means of screws 50 which are movable in slots 51 for aligning the light source and photocell with the slots.

As the slots 45 and 46 move past the light source 47 and the photocell 48 the light admitted to the photocell is interrupted at a rate determined by the velocity at which the arm 15 moves. How this light is converted to a measure of the velocity at which the beam moves at point 42 is indicated by FIG. 4.

FIG. 4 shows a voltage source 52 which is connected to the photocell 48 through a switch 53 and a resistor 54. With the connection, interruption of the light applied to photocell varies the electrical characteristics of the photocell and produces a corresponding voltage charge across the resistor 54 which is connected through leads 55 and 56 to one channel of a multichannel oscillograph 57. Voltage is applied to the lamp 47 from a source 58 through a switch 59. The physical relationship of the light source 47 and photocell 48 is as indicated by FIGS. 2 and 6.

The trace produced on the face of the oscilloscope 57 by the voltage applied through the leads 55 and 56 is as shown by the curve A of FIG. 7. In this curve, the peaks B represent the voltage variations produced by the narrow slots 45 of the signal plate 43 and the peaks C represent the voltage variations produced by the wide slots 46.

For determining the time at which these peaks occur, a chronograph 60 is connected to a second channel of the oscillograph 57 and there is produced the trace D of FIG. 7 which consists of a series of evenly spaced calibrated dots. These traces, A and D, are recorded on a motion picture film 61 by a constant speed camera 62, producing the record of FIG. 7. The voltage output of the load cell 27 is simultaneously applied to a third channel to produce a trace (not shown) which is a measure of the thrust applied to the load cell 27 by the remover 25–26 and is recorded on the film 61 by the camera 62.

Since the peaks of the trace A represent equal distances along the path of travel of the remover part 25 and the dots of trace D represent equal periods of time, the change in velocity or acceleration is readily determined. Since the load cell records the thrust also on the film, correlation is obtained for determination of the time-thrust and thrust-distance relationship used for subsequent data reduction.

For a locked shut test of a remover 25–26 there is provided a pair of plates 63 and 64 which are fixed in the troughs of channels 10 and 11 and have openings 65 and 66 through which pins 67 and 68 may be inserted for preventing rotation of the arm 15 when the remover 25–26 is fired. For testing different types of removers the arm 15 is provided with a series of holes 69 and a series of holes 70, the former for adjusting the points at which the remover is attached to the arm and the latter for adjusting the weight distribution along the arm.

The sole function of the adjustable arm support 22 is to facilitate the mounting of the remover in the test mechanism. The pawls 19 and 20 function to stop the beam 15 at the end of its travel.

A buffer 71 may be supported by the channels 10 and 11 for preventing overtravel of the test arm 15 and this arm may be lowered by a block and fall 72 connected between an anchor 73 and the free end of the arm.

The buffer is necessary to absorb the energy contained by the moving arm and weight and reduce the momentum to zero. Otherwise the shock is so strong it will break up the device.

I claim:
1. In a mechanism for testing a device having parts movable with respect to one another by the firing of an explosive cartridge for operating a load device, the combination therewith of a base supporting a pair of uprights, a load cell mounted on said base and coupled to one of said parts, a test arm pivoted to said uprights at one of its ends and coupled to the other of said parts, said arm extending in the same general direction as does said base and having a weight distribution equivalent to that of said load device, means including a signal plate rotatable with said arm and having equally spaced slots, means fixed with respect to said base and uprights for directing radiant energy rays into one of said slots at a time as it is moved past said means, a voltage emitting device responsive to the intermittently received rays passed through said slots, time responsive means, means for producing a trace which is representative of a distance travelled by said arm, means for simultaneously producing traces which are representative of time and angular velocity and duration of upward travel of said arm, and photographic means for making a permanent record of said traces.

2. A mechanism according to claim 1 wherein means are provided for adjusting the weight distribution of said arm.

3. A mechanism according to claim 1 wherein means are provided for adjusting the point at which said other part is coupled to said arm.

4. In an apparatus for testing canopy removing apparatus for aircraft, said apparatus including at least one upright frame member, a base support to which said frame member is secured, a thrust testing arm pivotally secured to said frame member and generally parallel to said base support to simulate a canopy base, means for adjustably supporting an end portion of said arm remote from its pivot, a load cell having a voltage output proportional to load and connected between said canopy removing apparatus and a thrust receiving element, a signal plate secured to said arm for angular movement therewith and being provided with equally spaced perforations adjacent a peripheral edge of said plate, a light source fixed with respect to said base for directing light through a plate perforation one at a time, a photocell also fixed with respect to said base for receiving light from said source through a plate perforation, a three channel oscilloscope, circuit connections for supplying the output of said load cell to one channel of said oscilloscope, circuit connections for supplying said photocell output to a second channel of said oscilloscope, a chronograph, electrical connections for feeding timing pulses from said chronograph to a third channel of said oscilloscope, and a motion picture camera by means of which a photographic record may be made of traces from the oscilloscope channels.

5. Apparatus according to claim 4 in which a buffer is provided to cushion upward movement of said arm.

6. Apparatus according to claim 4 in which means is provided whereby the place of attachment of said canopy removing apparatus to said arm may be varied to accord with the length of a canopy base between said pivot and the place of attachment of said canopy removing apparatus.

References Cited in the file of this patent
UNITED STATES PATENTS

| | | |
|---|---|---|
| 1,324,470 | Scott | Dec. 9, 1919 |
| 2,679,160 | Welch | May 25, 1954 |
| 2,859,621 | Knopf et al. | Nov. 11, 1958 |
| 3,090,228 | Laager et al. | May 21, 1963 |